US010873887B2

(12) United States Patent
Gheorghiu et al.

(10) Patent No.: US 10,873,887 B2
(45) Date of Patent: Dec. 22, 2020

(54) SEAMLESS HANDOVER WITH DUAL CONNECTIVITY

(71) Applicant: QUALCOMM Incorporated, San Diego, CA (US)

(72) Inventors: Valentin Alexandru Gheorghiu, Tokyo (JP); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 16/019,115

(22) Filed: Jun. 26, 2018

(65) Prior Publication Data

US 2019/0007875 A1    Jan. 3, 2019

Related U.S. Application Data

(60) Provisional application No. 62/527,872, filed on Jun. 30, 2017.

(51) Int. Cl.
| | | |
|---|---|---|
| *H04W 36/18* | (2009.01) | |
| *H04W 36/08* | (2009.01) | |
| *H04W 36/00* | (2009.01) | |
| *H04W 24/10* | (2009.01) | |
| *H04W 36/30* | (2009.01) | |
| *H04W 76/15* | (2018.01) | |
| *H04W 36/24* | (2009.01) | |

(52) U.S. Cl.
CPC .......... *H04W 36/08* (2013.01); *H04W 24/10* (2013.01); *H04W 36/0088* (2013.01); *H04W 36/18* (2013.01); *H04W 36/30* (2013.01); *H04W 76/15* (2018.02); *H04W 36/24* (2013.01)

(58) Field of Classification Search
CPC .............................. H04W 36/08; H04W 36/18
See application file for complete search history.

(56) References Cited

U.S. PATENT DOCUMENTS

| | | | |
|---|---|---|---|
| 8,369,290 B2 | 2/2013 | Xing et al. | |
| 8,699,459 B2 * | 4/2014 | Jung ................. | H04W 36/0061 |
| | | | 370/331 |
| 9,331,823 B2 * | 5/2016 | Wang ........................ | H04L 5/00 |
| 2009/0215442 A1 * | 8/2009 | Lindoff .................. | H04B 1/036 |
| | | | 455/423 |
| 2011/0183674 A1 | 7/2011 | Lee et al. | |
| 2012/0322486 A1 * | 12/2012 | Kameno ............... | H04W 28/16 |
| | | | 455/509 |
| 2016/0192261 A1 | 6/2016 | Wang et al. | |
| 2017/0111841 A1 * | 4/2017 | Henttonen ............ | H04W 36/28 |
| 2017/0303140 A1 | 10/2017 | Li et al. | |
| 2018/0227815 A1 * | 8/2018 | Sharma ................. | H04W 28/08 |

* cited by examiner

Primary Examiner — Michael T Vu
(74) Attorney, Agent, or Firm — Patterson & Sheridan, L.L.P

(57) ABSTRACT

Methods and apparatus are provided for seamless handover of a User Equipment (UE) between base stations using dual connectivity. The UE receives an indication of a handover of the UE from a source Base Station (BS) to a target BS, wherein the source BS and the target BS are associated with the same Radio Access Technology (RAT). The UE allocates a portion of UE resources for initiating a handover procedure with the target BS, while maintaining connectivity with the source BS. The UE terminates connectivity with the source BS after completion of the handover procedure, wherein the UE is connected to both the source BS and the target BS during at least a portion of the handover procedure.

25 Claims, 10 Drawing Sheets

SEAMLESS HANDOVER WITH DUAL CONNECTIVITY

This application claims priority to U.S. Provisional Application Ser. No. 62/527,872, entitled "SEAMLESS HANDOVER WITH DUAL CONNECTIVITY", filed on Jun. 30, 2017, which is expressly incorporated by reference in its entirety.

FIELD

The present disclosure relates generally to wireless communication systems, and more particularly, to methods and apparatus for seamless handover of a User Equipment with dual connectivity.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or $5^{th}$ generation (5G) network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a User Equipment (UE). The method generally includes receiving an indication of a handover of the UE from a source Base Station (BS) to a target BS, wherein the source BS and the target BS are associated with the same Radio Access Technology (RAT), allocating a portion of UE resources for initiating a handover procedure with the target BS, while maintaining connectivity with the source BS, and terminating connectivity with the source BS after completion of the handover procedure, wherein the UE is connected to both the source BS and the target BS during at least a portion of the handover procedure.

Certain aspects of the present disclosure provide a method for wireless communications by a source Base Station (BS). The method generally includes deciding to handover a User Equipment (UE) from the source BS to a target BS, wherein the source BS and the target BS are associated with the same Radio Access Technology (RAT), receiving information regarding UE capability to allocate a portion of UE resources for initiating a handover procedure with the target BS while maintaining connectivity with the source BS, and transmitting an indication to the UE regarding the handover based on the UE capability.

Certain aspects of the present disclosure provide an apparatus for wireless communications by a User Equipment (UE). The apparatus generally includes means for receiving an indication of a handover of the UE from a source Base Station (BS) to a target BS, wherein the source BS and the target BS are associated with the same Radio Access Technology (RAT), means for allocating a portion of UE resources for initiating a handover procedure with the target BS, while maintaining connectivity with the source BS, and means for terminating connectivity with the source BS after completion of the handover procedure, wherein the UE is connected to both the source BS and the target BS during at least a portion of the handover procedure.

Certain aspects of the present disclosure provide an apparatus for wireless communications by a source Base Station (BS). The method generally includes means for deciding to handover a User Equipment (UE) from the source BS to a target BS, wherein the source BS and the target BS are associated with the same Radio Access Technology (RAT), means for receiving information regarding UE capability to allocate a portion of UE resources for initiating a handover procedure with the target BS while maintaining connectivity with the source BS, and means for transmitting an indication to the UE regarding the handover based on the UE capability.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
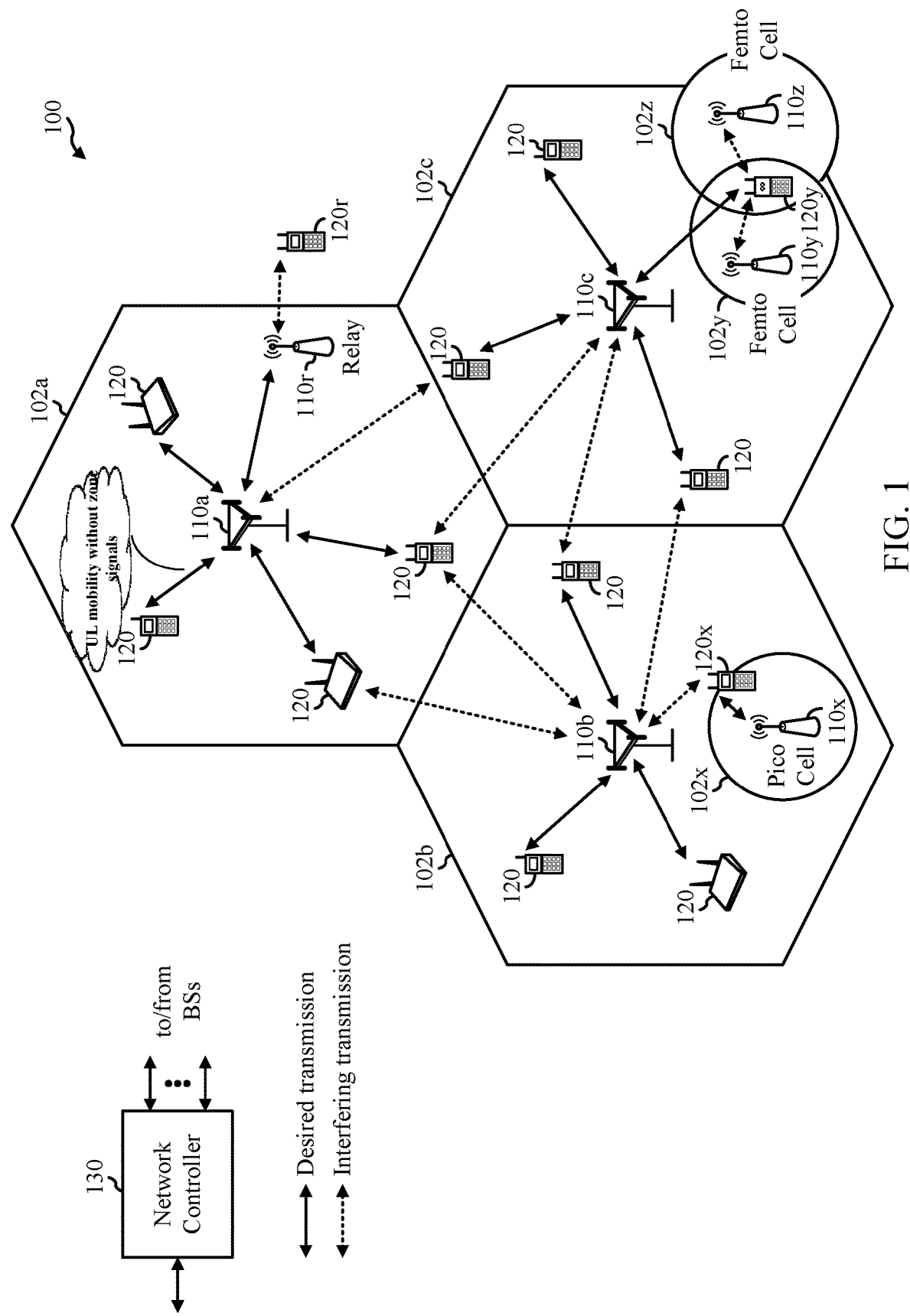
FIG. 1 is a block diagram conceptually illustrating an example telecommunications system, in accordance with certain aspects of the present disclosure.

Cellular systems rely on handover of wireless terminals (e.g., UEs) between base stations to maintain connectivity, for example, while UEs move across cells in the network. In LTE, for handing over a UE from a source cell to a target cell the connection to the source cell is dropped before the connection to the target cell is established. Such handovers are referred to as make-after-break or break-before-make. This often leads to an interruption in service to the UE as, for example, the UE has to acquire synchronization to the target cell and then initiate a random access procedure with the target cell. For example, in LTE the interruption during handover is about 20 ms.

NR has a target of 0 ms interruption at handover. Thus, some sort of make-before-break handover is needed, which includes establishing connection with the target cell before dropping connection with the source cell, thus providing a seamless handover between the cells. In certain aspects, the make-before-break type of handover may include the UE initiating connection to the target cell before dropping connection to the source cell. In an aspect, the initiating connection to the target cell and dropping connection to the source cell may be simultaneous. This type of make-before-break handover is also referred to as dual connectivity handover, as the UE is simultaneously connected to the source cell and the target cell briefly during handover.

Certain aspects of the present disclosure discuss techniques for using certain capabilities of a UE for a seamless handover between base stations. These techniques generally include allocating a portion of UE resources for initiating a handover procedure with a target base station, while maintaining connectivity with a source base station, and dropping connection with the source base station only after the handover procedure with the target is complete.

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth (e.g., system frequency band) into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
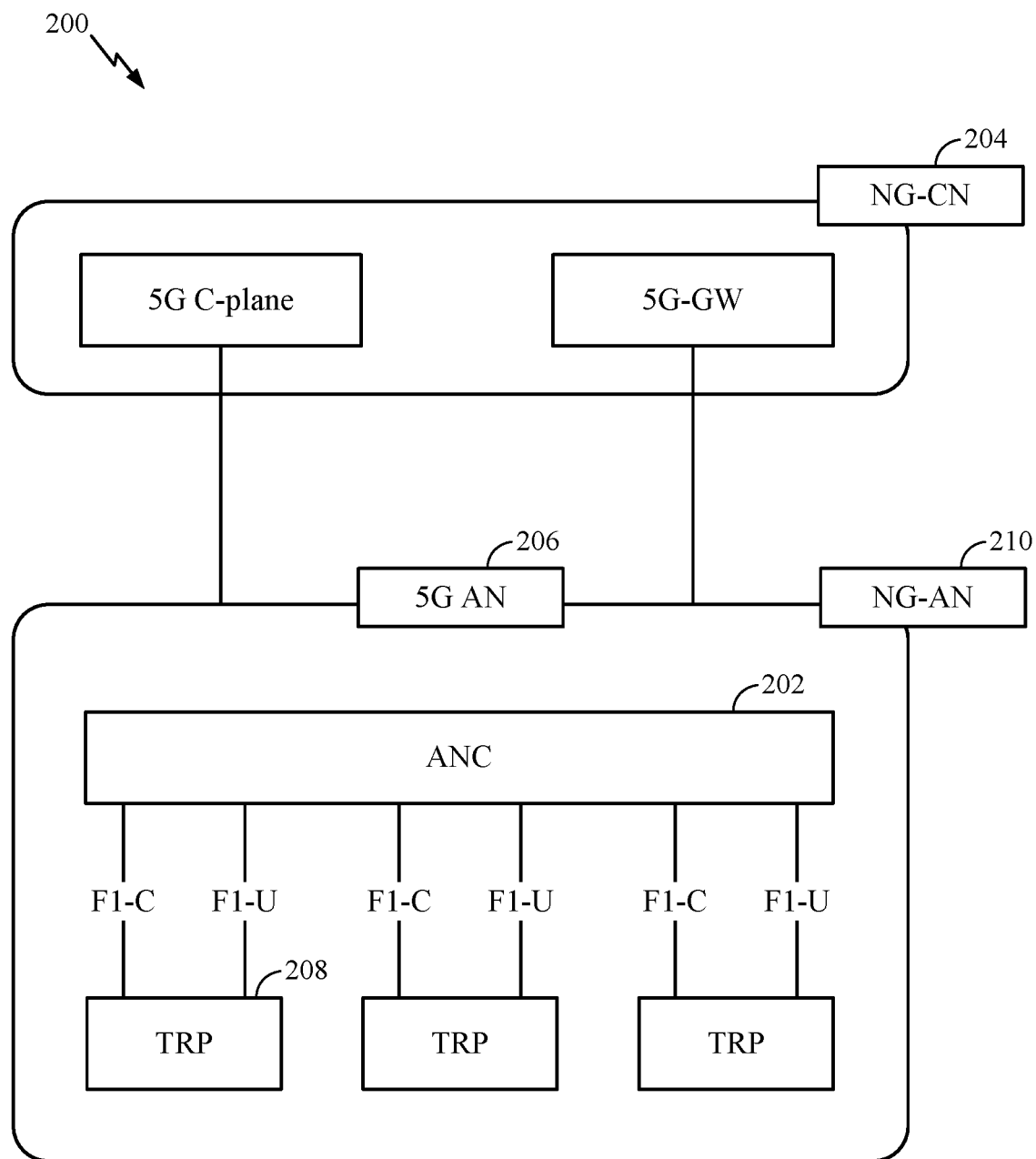
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
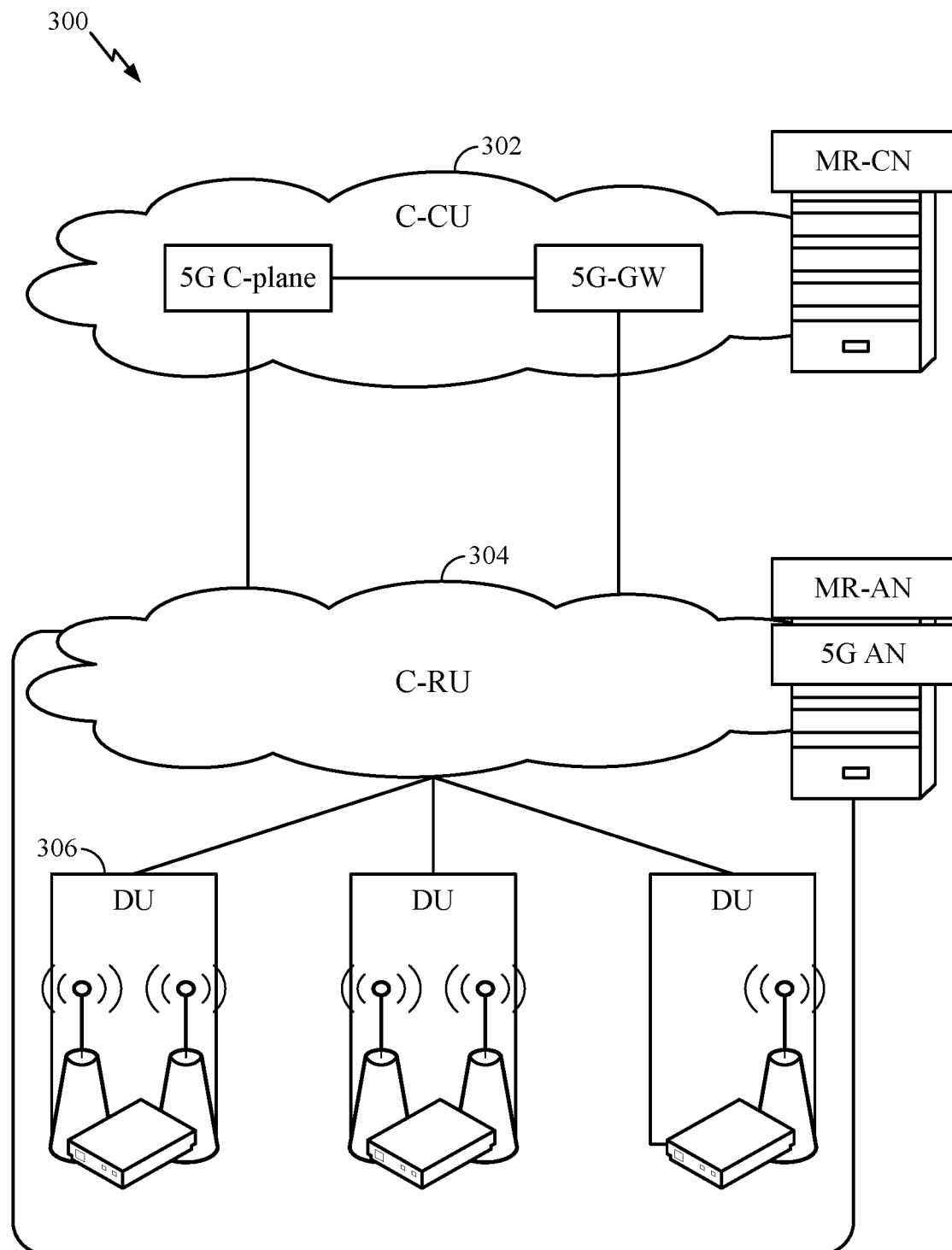
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
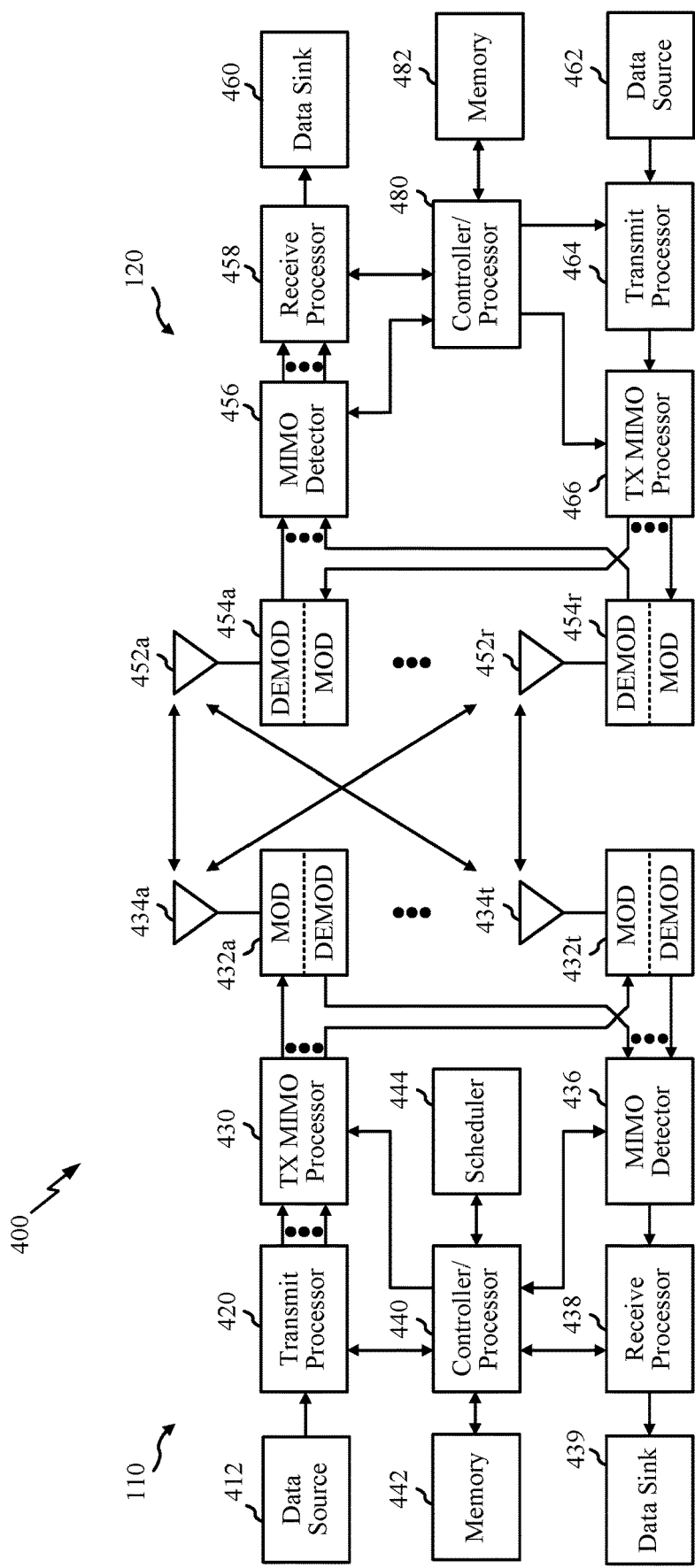
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 8-9.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 10, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
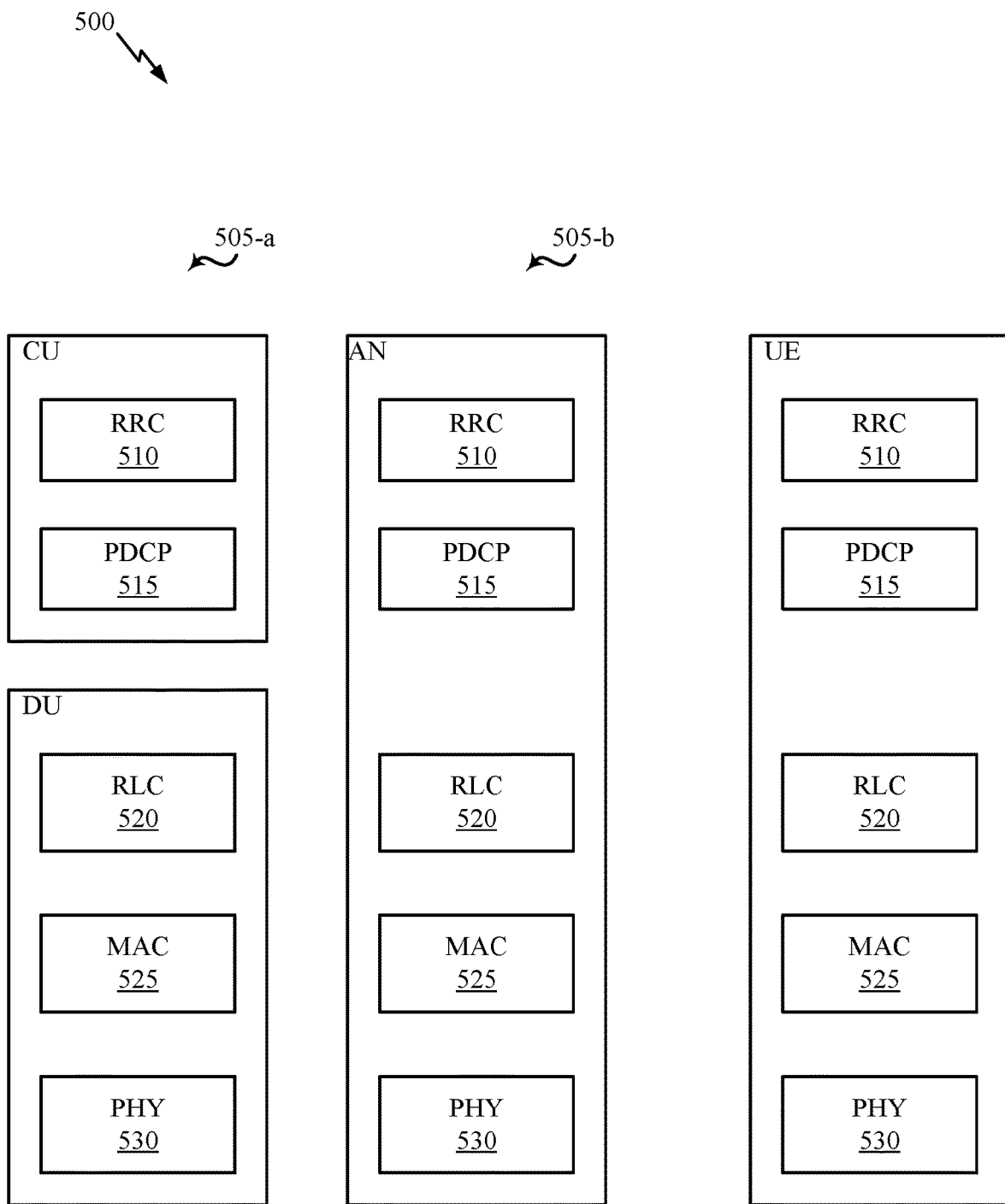
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
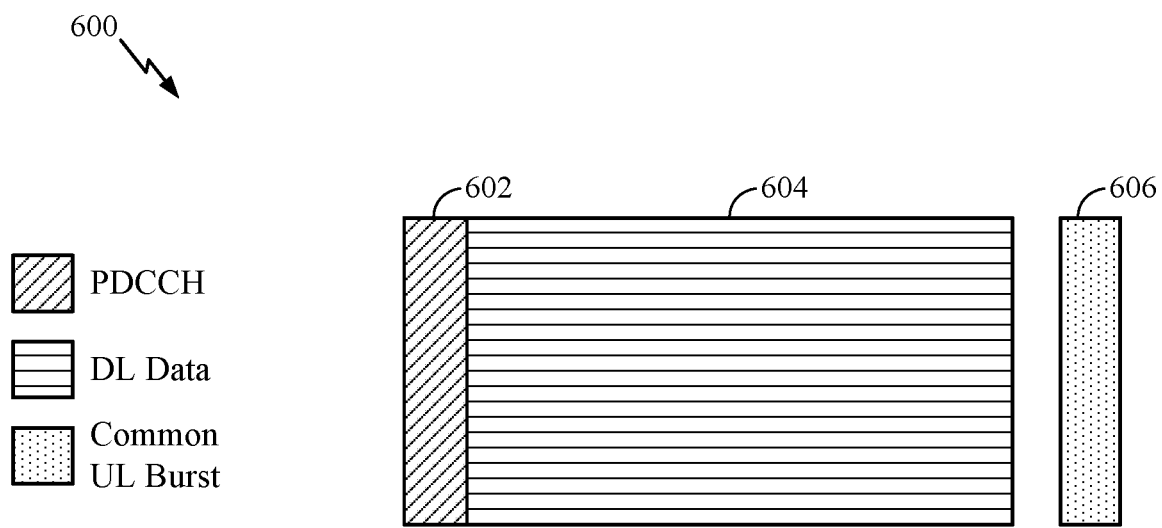
FIG. 6 illustrates an example of a downlink-centric (DL-centric) subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
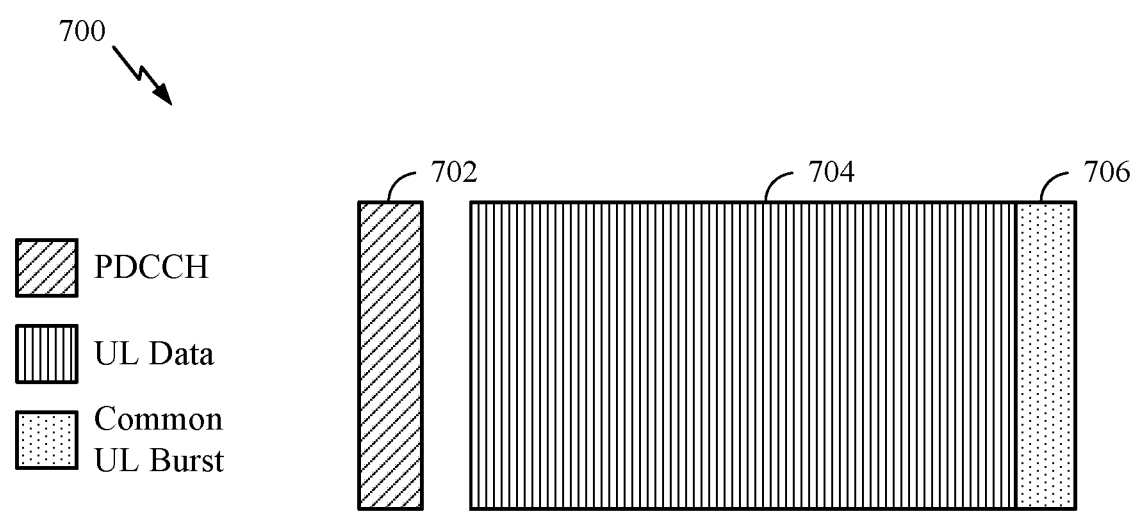
FIG. 7 illustrates an example of an uplink-centric (UL-centric) subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Seamless Handover of a UE Using Dual Connectivity

Cellular systems rely on handover of wireless terminals (e.g., UEs) between base stations to maintain connectivity, for example, while UEs move across cells in the network. In LTE, for handing over a UE from a source cell to a target cell the connection to the source cell is dropped before the connection to the target cell is established. Such handovers are referred to as make-after-break or break-before-make. This often leads to an interruption in service to the UE as, for example, the UE has to acquire synchronization to the target cell and then initiate a random access procedure with the target cell. For example, in LTE the interruption during handover is about 20 ms.

NR has a target of 0 ms interruption at handover. Thus, some sort of make-before-break handover is needed, which includes establishing connection with the target cell before dropping connection with the source cell. In certain aspects, the make-before-break type of handover may include the UE initiating connection to the target cell before dropping connection to the source cell. In an aspect, the initiating connection to the target cell and dropping connection to the source cell may be simultaneous. This type of make-before-break handover is also referred to as dual connectivity handover, as the UE is simultaneously connected to the source cell and the target cell briefly during handover.

In certain aspects, NR devices support certain features/capabilities that may be used during handovers to reduce the handover interruption. For example, NR devices support carrier aggregation (CA) allowing a NR UE to communicate over multiple frequencies (e.g., component carriers, CCs) at the same time. Another feature supported by NR devices is high order receive diversity. For example, a NR UE may include 4 or 8 receive chains for receiving signals in a single band. NR devices also support UL MIMO. For example, a NR UE may use multiple transmit antennas in the same frequency band. For example, a NR UE may include 2 transmit chains using which the UE may implement UL MIMO communication.

Certain aspects of the present disclosure discuss techniques for using certain capabilities of a UE for a seamless handover between base stations. These techniques generally include allocating a portion of UE resources for initiating a handover procedure with a target base station, while maintaining connectivity with a source base station, and dropping connection with the source base station only after the handover procedure with the target is complete.

Figure 8:
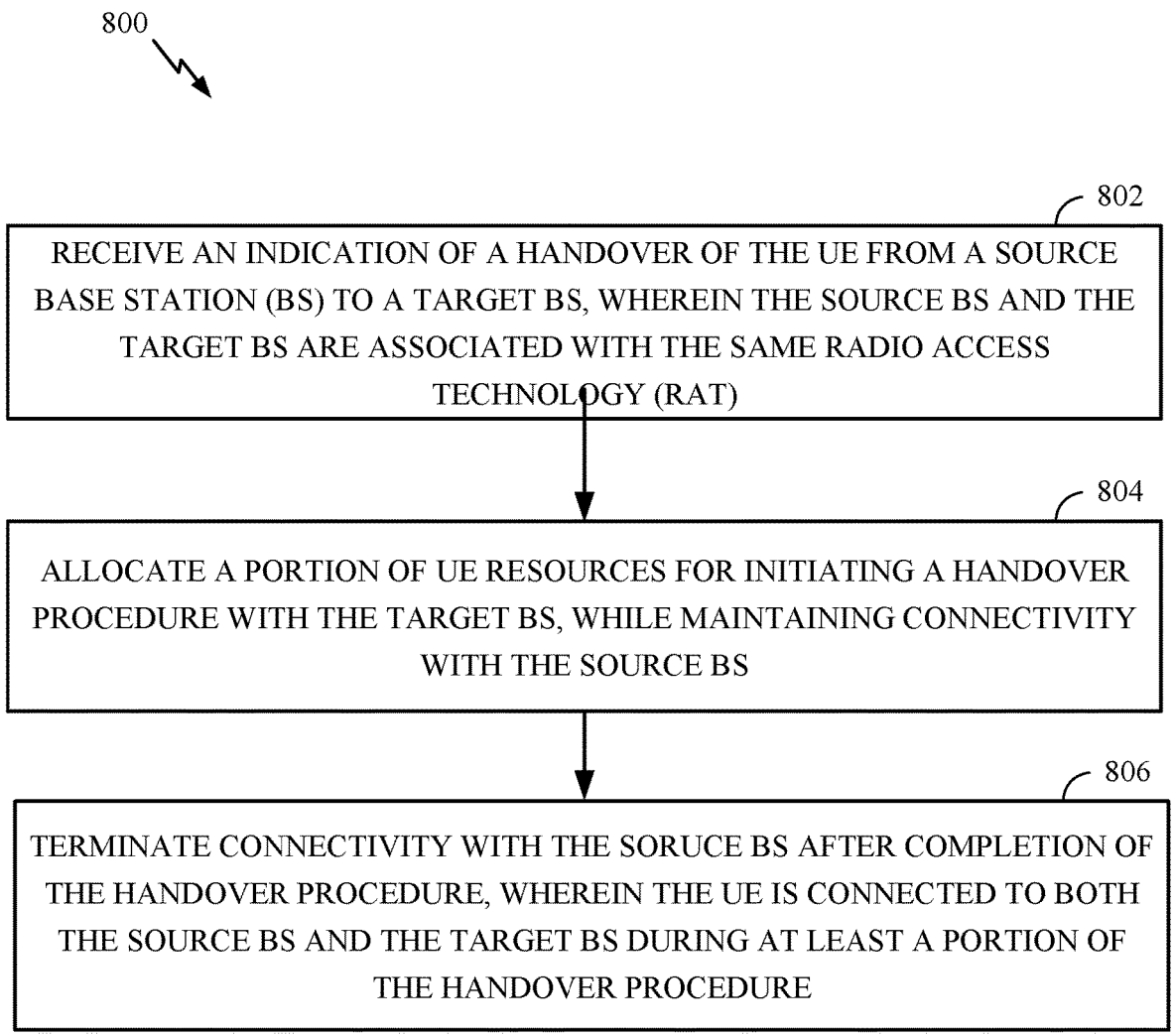
FIG. 8 illustrates example operations 800 for a seamless handover performed by a UE, in accordance with certain aspects of the present disclosure.

FIG. 8 illustrates example operations 800 for a seamless handover performed by a UE, in accordance with certain aspects of the present disclosure. Operations 800 begin, at 802, by receiving an indication of a handover of the UE from a source base station (BS) to a target BS. At 804, the UE allocates a portion of UE resources for initiating a handover procedure with the target BS, while maintaining connectivity with the source BS. At 806, the UE terminates connectivity with the source BS after completion of the handover procedure. In an aspect, the indication of handover includes a handover command. In an aspect, both the source BS and the target BS are associated with the same Radio Access Technology (RAT), for example, NR. As noted above, the UE is connected to both the source BS and the target BS during at least a portion of the handover procedure.

Figure 9:
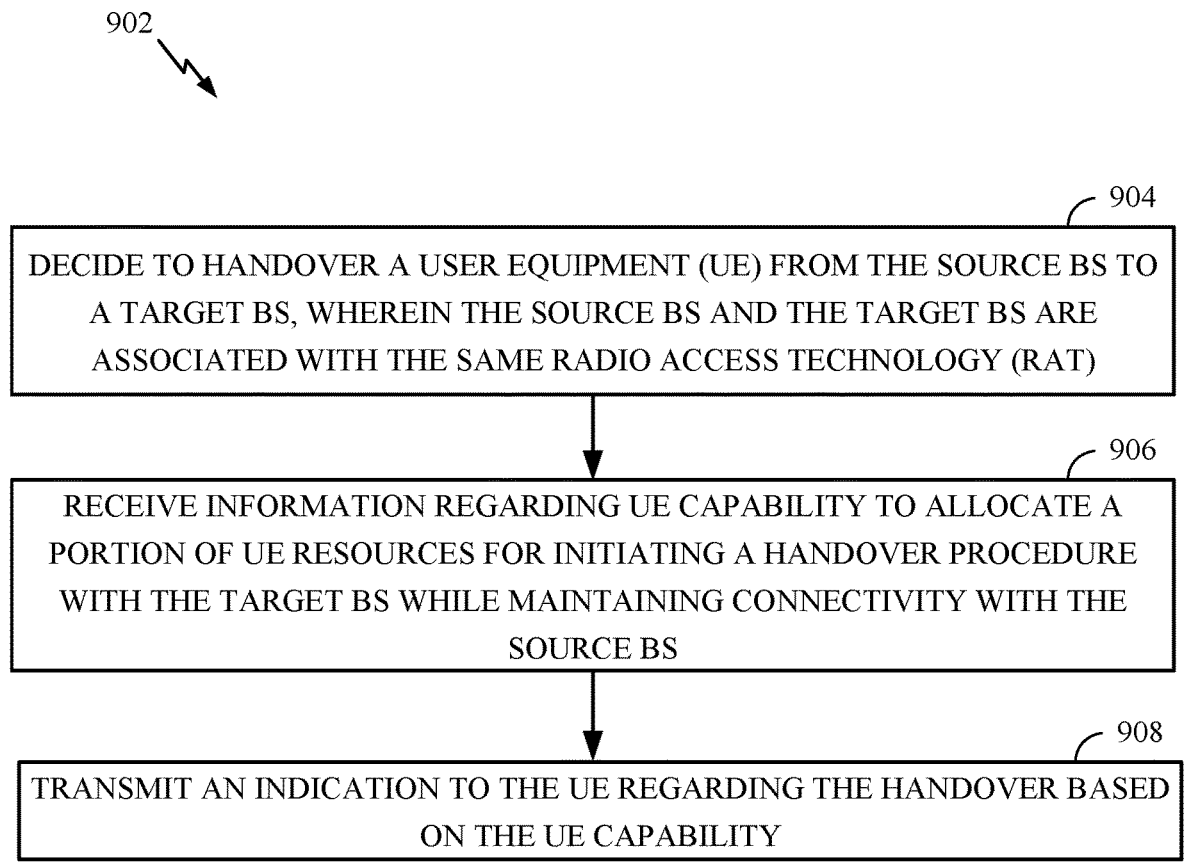
FIG. 9 illustrates example operations 900 for a seamless handover performed by a source BS, in accordance with certain aspects of the present disclosure.

FIG. 9 illustrates example operations 900 for a seamless handover performed by a source BS (e.g., gNB), in accordance with certain aspects of the present disclosure. Operations 900 begin, at 902, by deciding to handover a UE from the source BS to a target BS. At 804, the source BS receives information regarding UE capability to allocate a portion of UE resources for initiating a handover procedure with the target BS while maintaining connectivity with the source BS. At 806, the source BS transmits an indication to the UE regarding the handover based on the UE capability. In an aspect, both the source BS and the target BS are associated with the same RAT.

In certain aspects, allocating a portion of UE resources for initiating the handover may include switching at least one transmit chain, at least one receive chain, or a combination thereof for initiating the handover procedure with the target BS, while maintaining connection with the source base station using at least one remaining transmit chain and/or at least one remaining receive chain.

In certain aspects, the capability of the UE to support multiple transmit chains may be used for a seamless handover between a source base station (BS) and a target BS. In an aspect, the UE may switch one or more of its transmit chains to the target cell to execute handover to the target cell, while maintaining connectivity with the source cell using one or more remaining transmit chains. Once the handover procedure is successfully completed, the UE may drop connectivity with the source cell and may switch the remaining transmit chains to the target cell.

For example, a UE capable of UL MIMO using two separate transmit chains may use each of the two transmit chains to communicate to a different base station at the same time. For a handover of the UE between source and target BSs, the UE may switch one transmit chain to the target BS and maintain connectivity to the source BS using the other transmit chain. After the handover is completed, the UE may drop connectivity with the source and tune both transmit chains to the target.

In certain aspects, additionally or alternatively, the capability of the UE to support multiple receive chains may be used for a seamless handover between a source base station (BS) and a target BS. In an aspect, the UE may switch one or more of its receive chains to the target cell to execute handover to the target cell, while maintaining connectivity with the source cell using one or more remaining receive chains. Once the handover procedure is successfully completed, the UE may drop connectivity with the source cell and may switch the remaining receive chains to the target cell.

For example, a UE capable of higher order receive diversity using four separate receive chains may use each of the receive chains to receive signals from a different base station at the same time. For a handover of the UE between source and target BSs, the UE may switch two of the four receive chains to the target BS and maintain connectivity to the source BS using the remaining two receive chains. After the handover is completed, the UE may drop connectivity with the source and tune all four receive chains to the target.

In certain aspects, the UE may either tune one or more transmit chains or one or more receive chains to the target. For example, if only one or more transmit chains are tuned to the target for initiating the handover, the receive chains may be time division multiplexed (TDM) between the source and the target. For example, all receive chains are tuned either to the source or the target at one time, and switched between the source and the target based on a TDM configuration, such that the UE receives signals from the source in one set of subframes and then switches to the target and receives signals from the target in another set of subframes. By time division multiplexing the receive chains between the source and the target the UE may receive signals from the target related to the handover while maintaining connectivity with the source. Similarly, if only one or more receive chains are tuned to the target, the transmit chains may be time division multiplexed between the source and the target. While time division multiplexing transmit chains or receive chains may lead to some interruption in service during handover, the resulting interruption is still considerably shorter as compared to a break-before-make handover.

In certain aspects, by tuning one or more transmit chains and one or more receive chains for the handover such that the UE may transmit and receive simultaneously from both source and target, there may be no or negligible handover interruption.

In certain aspect, retuning of one or more transmit and/or receive chains may be autonomously decided by the UE or dictated by the network (e.g., via signaling).

In certain aspects, the UE may receive an indication of the handover from the base station. For example, the UE may receive a handover command from the network (e.g., transmitted by source BS) to handover from the source BS to the target BS. The UE may retune one or more of its transmit and/or receive chains to the target cell in response to receiving the handover command.

In certain aspects, for the example case of the UE supporting UL MIMO with two transmit chains, the UE may stop transmitting using UL MIMO to the source cell when it receives the handover command. In an aspect, the UE may switch from rank 2 transmission to rank 1 transmission to the source.

In an aspect, the decision of the UE to retune one or more of its transmit and/or receive chains to the target for the handover may be autonomous and not directed by the network.

In certain aspects, for the example case when the UE supports receive diversity using four receive chains, the UE may fallback to 2RX MIMO (e.g., using two receive chains) communication with the source cell when it receives the handover command. In an aspect, the UE may use the remaining two receive chains for 2RX MIMO communication with the target cell.

In certain aspects, the UE may transmit a request to the source BS to retune one or more of its transmit chains and/or one or more receive chains to the target base station to perform the handover. In response, the source base station may signal the UE to switch one or more transmit chains and/or one or more receive chains to the target base station for performing the handover.

In certain aspects, the UE may inform the network of one or more of its capabilities by transmitting information regarding one or more UE capabilities to the source BS.

In certain aspects, the UE may transmit information regarding UE capability relating to switching at least one transmit chain, at least one receive chain or a combination thereof to a target BS for performing a handover procedure. In an aspect, not all UEs having two or more transmit and/or receive chains can retune transmit and/or receive chains to a target BS for performing a handover. By transmitting the UE's capability to retune transmit/receive chains for handover, the network knows what to expect, for example, in terms of an amount of interruption during a handover of a particular UE. Further, when the network is in charge of directing UEs to retune its transmit and/or receive chains for the handover, information regarding UE capability enables the network to select UEs for the retune based on their capability for seamless handover.

In certain aspects, the UE may transmit information regarding UE capability relating to one or more frequency channels and/or one or more frequency band the UE is capable to switch one or more transmit and/or receive chains to for performing the handover procedure. In an aspect, different transmit/receive chains support different bands, and the UE may not support seamless handover for any source-target band combination. In an aspect, a UE may select a transmit and/or receive antenna for retuning to the target based on the frequency bands supported on each transmit/receive chain. For example, a UE may select a transmit and/or receive antenna that supports a frequency band of the target cell.

In certain aspects, the information regarding UE capability may be sent to the network statically (e.g., when the UE attaches to the network) or dynamically (e.g., as part of measurement reports of candidate cells for handover).

In certain aspect, the network may select a target cell/target BS for handover of a UE based on the UE's capabilities for seamless handover. For example, the network may select a target cell/target BS for handover of the UE if the UE supports retuning of one or more of its transmit and/or receive chains to the frequency band used by the target cell/target BS. In an aspect, the UE may report measurements on multiple frequencies, but may support transmit/receive chain retuning only on some of those frequencies. The network may select a target cell based on the UE's capability to retune transmit and/or receive chains to the selected frequency. In an aspect, the network transmits an indication to initiate handover to the selected target cell, for example, as part of the handover command. In an aspect, the network may prioritize potential candidate cell for handover of the UE based on the UE capability to support seamless handover on one or more of the candidate cells. In an aspect, the UE may include, in the measurement reports of the candidates, information regarding which candidates are suitable for seamless handover by the UE.

In certain aspects, after successfully completing the handover procedure with the target BS, the UE may transmit an indication to the source BS of the handover completion. The source BS may then release its connection to the UE and may transmit UE context to the target BS.

In certain aspects, allocating a portion of the UE resources for initiating the handover with the target BS includes allocating resources (e.g., transmit and/or receive chain(s)) corresponding to at least one component carrier (CC) for performing the handover to the target BS, where the at least one CC is configured in a carrier aggregation (CA) configuration with at least one other CC for communication with the source BS.

In certain aspects, one of the UE capabilities may include support for carrier aggregation. A UE supporting carrier aggregation may use one or more RF chains, tuned to component carriers in a CA configuration for communication with a source cell, to connect to the target cell during handover.

In certain aspects, a UE may drop one or more CCs used for communication with the source cell, and retune receive and/or transmit chains tuned to those CCs to the target cell for performing a procedure related to the handover. In an aspect, the UE may drop the one or more CCs and retune RF chains corresponding to the CCs to the target cell after receiving a handover command from the source cell. In certain aspect, the UE dropping the one or more CCs and retuning corresponding RF chains to the target may be autonomous or in response to signaling from the network.

In certain aspects, the UE may autonomously decide to drop one or more CCs and send CQI of 0 corresponding to those CCs to the source BS. In certain aspects, if there are multiple CCs that the UE may drop and retune corresponding RF chains to the target cell, the UE may select one or more CCs to drop of those multiple CCs based on some criteria. In an aspect the criteria includes selecting a secondary cell (SCell) CC to drop that may cause no interruptions or least interruptions on the source primary cell (Pcell) when retuning to the target cell. Another criterion may include selecting a SCell CC with lower SNR compared to other SCells or selecting an SCell with lower bandwidth.

In certain aspects, the UE may be configured to transmit information regarding UE capability regarding dropping one or more CCs and retuning corresponding RF chains to the target cell during handover.

For example, the UE may inform the network of its capability to drop one of more CCs and retuning corresponding RF chains to the target. Further, the UE may inform the network of the RF chains corresponding to which particular one or more CCs the UE is able to retune to the target cell. The ability of the UE to retune RF resources corresponding to particular CCs may depend of the RF capabilities of the UE. For example, the not all transmitters/receivers may be able to tune to a target frequency of the target cell. Further, the UE may transmit information to the network regarding on which frequencies and/or frequency bands the UE may support seamless handover by retuning RF chains corresponding to certain CCs to the target cell.

In certain aspects, the UE may transmit information regarding its capability to drop CCs and retune corresponding RF chains when the UE attaches to the network, when the UE is configured with CA (e.g., depending on CA configuration, when it receives a handover command, or when it sends measurement reports.

The network may signal the UE to drop one or more of the CCs and retune corresponding RF chains to the target cell, based on the UE capability. Further, in an aspect, the network selects a target cell based on information regarding the UE capability. For example, the network may select a target cell whose operating frequency is supported by the UE for the seamless handover.

In certain aspects, the UE may inform the network of successful completion of the handover procedure and that other CCs (e.g., CCs still tuned to the source cell) may be configured/activated. In response, the network may configure one or more CCs for use with the target cell including CCs that were used for maintaining connectivity with the source cell during handover.

In certain aspects, if the target cell/frequency is supported as a CA combination of CCs, the network may first configure the target cell as SCell and then swap PCell with the configured SCell when handover is complete for a seamless handover.

In certain aspects, the network may select a target cell for handover of the UE based on CA combinations of CCs supported by the UE. In an aspect, CA combinations supported by the UE are known to the network. In an aspect, the network configures the target cell as SCell before sending the handover command. In an aspect, the handover command may imply the PCell-SCell swap.

In certain aspects, when a CA configuration is changed, it is possible that the UE may cause some short interruptions (e.g., drops few subframes) because it has to make some changes in the RF circuit settings which may cause the receive signal to be corrupted. In certain aspects, the UE may signal to the network the CA combinations of CCs in which the UE may not cause any interruption or may cause acceptable interruption when switching source PCell with target SCell or when the target SCell is configured.

Figure 10:
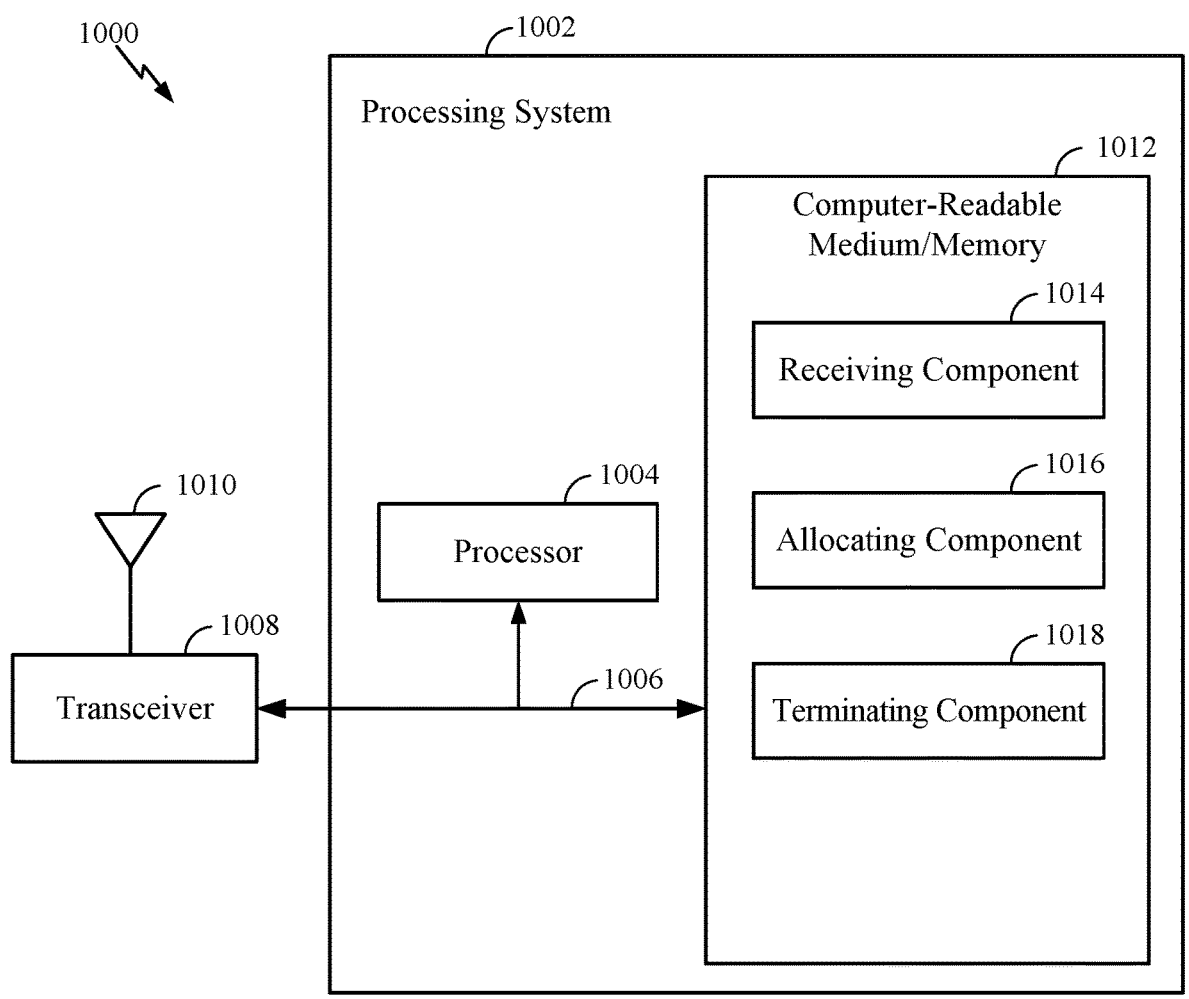
FIG. 10 illustrates a communications device 1000 that may include various components (e.g., corresponding to means-plus-function components) configured to perform operations for the techniques disclosed herein, such as the operations illustrated in FIG. 8.

FIG. 10 illustrates a communications device 1000 that may include various components (e.g., corresponding to means-plus-function components) configured to perform operations for the techniques disclosed herein, such as the operations illustrated in FIG. 8. The communications device 1000 includes a processing system 1002 coupled to a transceiver 1008. The transceiver 1008 is configured to transmit and receive signals for the communications device 1000 via an antenna 1010, such as the various signal described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions that when executed by processor 1004, cause the processor 1004 to perform the operations illustrated in FIG. 8, or other operations for performing the various techniques discussed herein.

In certain aspects, the computer-readable medium/memory 1012 includes a receiving component 1014 to cause the processor to perform the receiving operation illustrated in FIG. 8. Additionally, the computer-readable medium/memory 1012 includes an allocating component 1016 to cause the processor 1004 to perform the allocating operation illustrated in FIG. 8. Additionally, the computer-readable medium/memory 1012 includes a terminating component 1018 for causing the processor 1004 to perform the terminating operation illustrated in FIG. 8. The receiving component 1014, allocating component 1016, and terminating component 1018 may be coupled to the processor 1004 via bus 1006. In certain aspects, the receiving component 1014, allocating component 1016, and terminating component 1018 may be hardware circuits. In certain aspects, the receiving component 1014, allocating component 1016, and terminating component 1018 may be software components that are executed and run on processor 1004.

Figure 11:
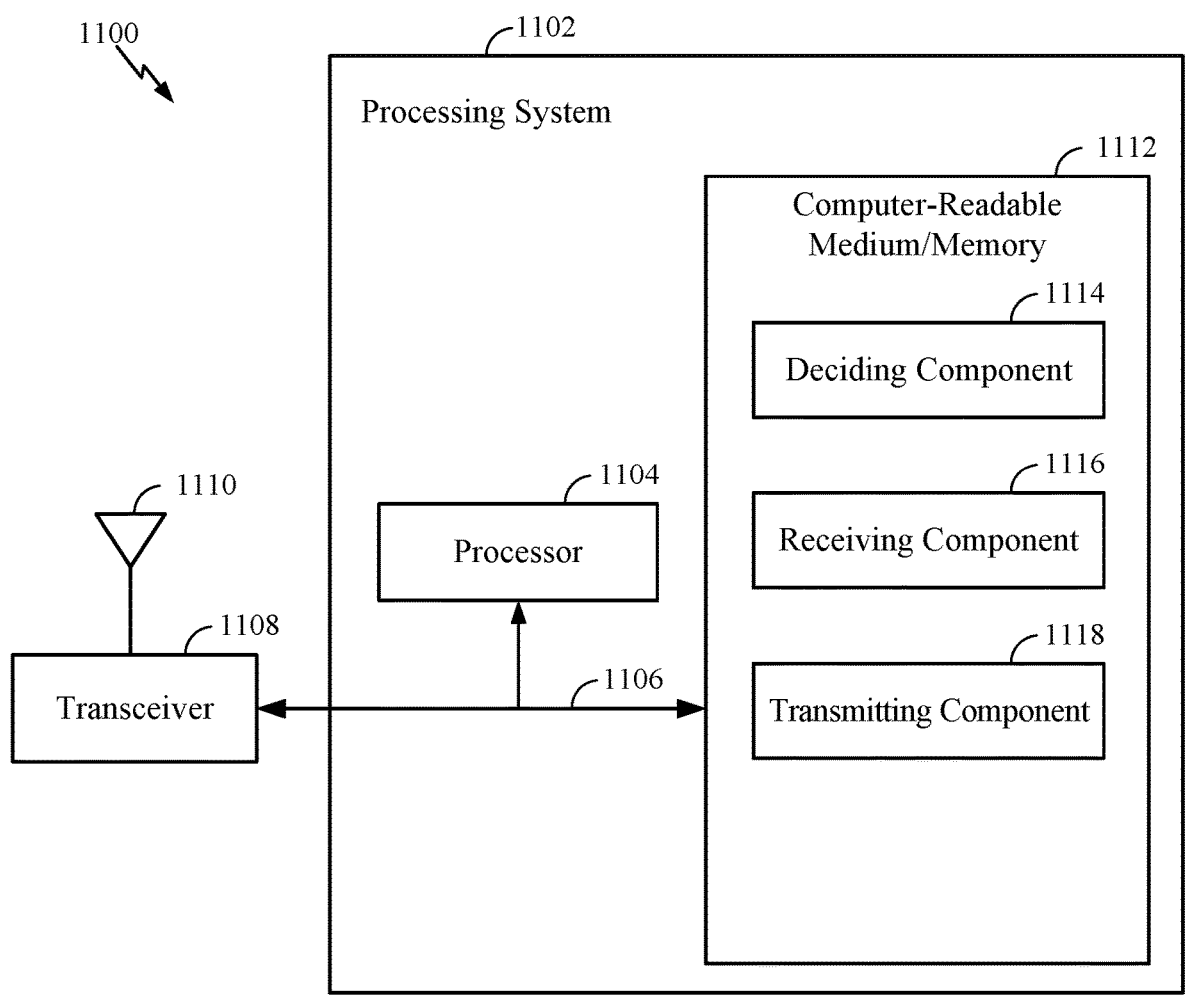
FIG. 11 illustrates a communications device 1100 that may include various components (e.g., corresponding to means-plus-function components) configured to perform operations for the techniques disclosed herein, such as the operations illustrated in FIG. 9.

FIG. 11 illustrates a communications device 1100 that may include various components (e.g., corresponding to means-plus-function components) configured to perform operations for the techniques disclosed herein, such as the operations illustrated in FIG. 9. The communications device 1100 includes a processing system 1102 coupled to a transceiver 1108. The transceiver 1108 is configured to transmit and receive signals for the communications device 1100 via an antenna 1110, such as the various signal described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions that when executed by processor 1104, cause the processor 1104 to perform the operations illustrated in FIG. 9, or other operations for performing the various techniques discussed herein.

In certain aspects, the computer-readable medium/memory 1112 includes a deciding component 1114 to cause the processor to perform the deciding operation illustrated in FIG. 9. Additionally, the computer-readable medium/memory 1112 includes a receiving component 1116 to cause the processor 1104 to perform the receiving operation illustrated in FIG. 9. Additionally, the computer-readable medium/memory 1112 includes a transmitting component 1118 for causing the processor 1104 to perform the obtaining operation illustrated in FIG. 9. The deciding component 1114, receiving component 1116, and transmitting component 1118 may be coupled to the processor 1104 via bus 1106. In certain aspects, the deciding component 1114, receiving component 1116, and transmitting component 1118 may be hardware circuits. In certain aspects, the deciding component 1114, receiving component 1116, and transmitting component 1118 may be software components that are executed and run on processor 1104.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for allocating and means for terminating, may comprise one or more processors, such as the controller/processor 480 of the user equipment 120. The means for deciding may comprise the controller/processor 440 of the base station 110.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
   receiving a handover command to handover the UE from a source base station (BS) to a target BS, wherein the source BS and the target BS are associated with a same radio access technology (RAT);
   allocating a portion of UE resources for initiating a handover procedure for the handover of the UE from the source BS to the target BS, while maintaining connectivity with the source BS, wherein allocating the portion of UE resources comprises:
      switching at least one transmit chain of a plurality of transmit chains, at least one receive chain of a plurality of receive chains, or a combination thereof to the target BS for initiating the handover procedure;
   performing, based on the handover command, the handover procedure with the target BS to hand over the UE from the source BS to the target BS using the at least one transmit chain, the at least one receive chain, or the combination thereof, wherein performing the handover procedure comprises:
      maintaining connectivity with the source BS during the handover procedure using at least one remaining transmit chain of the plurality of transmit chains and at least one remaining receive chain of the plurality of receive chains; and
      maintaining connectivity to both the source BS and the target BS during at least a portion of the handover procedure; and
   terminating connectivity with the source BS after completion of the handover procedure.

2. The method of claim 1, wherein switching the at least one receive chain comprises switching two receive chains out of four receive chains supported by the UE.

3. The method of claim 2, further comprising transmitting a channel quality indicator (CQI) based on the two receive chains.

4. The method of claim 1, further comprising transmitting information regarding UE capability to the source BS, wherein the UE capability includes a capability regarding switching the at least one transmit chain of the plurality of transmit chains, at least one receive chain of the plurality of receive chains, or a combination thereof to the target BS for initiating the handover procedure.

5. The method of claim 4, wherein the information regarding the UE capability further includes information regarding at least one of one or more frequency channels or one or more frequency bands the UE can switch the at least one transmit chain or the at least one receive chain or the combination thereof to for initiating the handover procedure.

6. The method of claim 5, further comprising receiving an indication from the source BS to initiate the handover procedure with the target BS, wherein the source BS selects the target BS for handover of the UE based on the information regarding the UE capability.

7. The method of claim 5, further comprising transmitting the information regarding the UE capability dynamically in measurement reports, the measurement reports relating to candidate cells for handover of the UE.

8. The method of claim 1, further comprising selecting the at least one transmit chain of the plurality of transmit chains, the at least one receive chain of the plurality of receive chains, or the combination thereof based on one or more frequencies supported by the at least one transmit chain, the at least one receive chain or the combination thereof.

9. The method of claim 1, further comprising selecting the at least one transmit chain of the plurality of transmit chains, the at least one receive chain of the plurality of receive chains, or the combination thereof based on a quality of signal received from the target B S.

10. The method of claim 9, wherein the selecting the at least one transmit chain of the plurality of transmit chains, the at least one receive chain of the plurality of receive chains, or the combination thereof having a highest receive signal strength from the target BS.

11. The method of claim 1, further comprising dropping the connectivity with the source BS and switching the remaining transmit chains to the target BS after successful completion of the handover procedure handing the UE over to the target BS.

12. The method of claim 1, further comprising receiving signaling from the source BS to switch the at least one transmit chain of a plurality of transmit chains, the at least one receive chain of a plurality of receive chains, or the combination thereof to the target BS.

13. The method of claim 12, further comprising transmitting, to the source BS, a request to switch the at least one transmit chain of a plurality of transmit chains, the at least one receive chain of a plurality of receive chains, or the combination thereof to the target BS, wherein the signaling received from the source BS to switch the at least one transmit chain of a plurality of transmit chains, the at least one receive chain of a plurality of receive chains, or the combination thereof to the target BS is received in response to the request transmitted to the source BS.

14. A method for wireless communication by a source base station (BS), comprising:
   deciding to handover a user equipment (UE) from the source BS to a target BS, wherein the source BS and the target BS are associated with a same radio access technology (RAT);
   receiving information regarding UE capability to allocate a portion of UE resources for initiating a handover procedure for the handover of the UE from the source BS to the target BS while maintaining connectivity with the source BS, wherein the information includes information regarding a UE capability to:
      switch at least one transmit chain of a plurality of transmit chains, at least one receive chain of a plurality of receive chains, or a combination thereof to the target BS for initiating the handover procedure; and
      maintain connectivity with the source BS using at least one remaining transmit chain of the plurality of transmit chains and at least one remaining receive chain of the plurality of receive chains; and
   transmitting a handover command to handover the UE from the source BS to the target BS based on the UE capability.

15. The method of claim 14, further comprising selecting the target BS for the handover based on the information regarding the UE capability.

16. The method of claim 14, wherein receiving the information includes receiving the information dynamically from the UE in measurement reports, the measurement reports relating to candidate cells for handover of the UE.

17. The method of claim 14, further comprising receiving a request from the UE for allocating the portion of the UE resources for initiating the handover procedure with the target BS.

18. The method of claim 17, further comprising transmitting an indication to allocate the portion of the UE resources for initiating the handover procedure, in response to the request.

19. The method of claim 14, wherein the information further includes information regarding UE capability to allocate one or more component carriers (CCs) for initiating the handover procedure.

20. The method of claim 19, wherein the information further includes information regarding at least one frequency band in which the UE supports allocation of one or more CCs for initiating the handover procedure.

21. The method of claim 14, further comprising:
receiving an indication from the UE that the handover was successfully completed; and
releasing a connection with the UE based on received indication that the handover was successfully completed; and
transmitting context information associated with the UE to the target BS based, at least in part, on the received indication that the handover was successfully completed.

22. An apparatus for wireless communication by a user equipment (UE), comprising:
means for receiving a handover command to handover the UE from a source base station (BS) to a target BS, wherein the source BS and the target BS are associated with a same radio access technology (RAT);
means for allocating a portion of UE resources for initiating a handover procedure for the handover of the UE from the source BS to the target BS while maintaining connectivity with the source BS, wherein the means for allocating the portion of UE resources comprise:
means for switching at least one transmit chain of a plurality of transmit chains, at least one receive chain of a plurality of receive chains, or a combination thereof to the target BS for initiating the handover procedure;
means for performing, based on the handover command, the handover procedure with the target BS to hand over the UE from the source BS to the target BS using the at least one transmit chain, the at least one receive chain, or the combination thereof, wherein performing the handover procedure comprises:
means for maintaining connectivity with the source BS during the handover procedure using at least one remaining transmit chain of the plurality of transmit chains and at least one remaining receive chain of the plurality of receive chains; and
means for maintaining connectivity to both the source BS and the target BS during at least a portion of the handover procedure; and
means for terminating connectivity with the source BS after completion of the handover procedure.

23. An apparatus for wireless communication by a source base station (BS), comprising:
means for deciding to handover a user equipment (UE) from the source BS to a target BS, wherein the source BS and the target BS are associated with a same radio access technology (RAT);
means for receiving information regarding UE capability to allocate a portion of UE resources for initiating a handover procedure for the handover of the UE from the source BS to the target BS while maintaining connectivity with the source BS, wherein the information includes information regarding a UE capability to:
switch at least one transmit chain of a plurality of transmit chains, at least one receive chain of a plurality of receive chains, or a combination thereof to the target BS for initiating the handover procedure; and
maintain connectivity with the source BS using at least one remaining transmit chain of the plurality of transmit chains and at least one remaining receive chain of the plurality of receive chains; and
means for transmitting a handover command to handover the UE from the source BS to the target BS based on the UE capability.

24. A non-transitory computer-readable medium for wireless communication by a user equipment (UE), comprising:
instructions that, when executed by at least one processor, cause the at least one processor to:
receive a handover command to hand over the UE from a source base station (BS) to a target BS, wherein the source BS and the target BS are associated with a same radio access technology (RAT);
allocate a portion of UE resources for initiating a handover procedure for the handover of the UE from the source BS to the target BS, while maintaining connectivity with the source BS, wherein the instructions that cause the at least one processor to allocate the portion of UE resources further comprise instructions that cause the at least one processor to:
switch at least one transmit chain of a plurality of transmit chains, at least one receive chain of a plurality of receive chains, or a combination thereof to the target BS for initiating the handover procedure;
perform, based on the handover command, the handover procedure with the target BS to hand over the UE from the source BS to the target BS using the at least one transmit chain, the at least one receive chain, or the combination thereof, wherein the instructions that cause the at least one processor to perform the handover procedure further comprise instructions that cause the at least one processor to:
maintain connectivity with the source BS during the handover procedure using at least one remaining transmit chain of the plurality of transmit chains and at least one remaining receive chain of the plurality of receive chains; and
maintain connectivity to both the source BS and the target BS during at least a portion of the handover procedure; and
terminate connectivity with the source BS after completion of the handover procedure.

25. A non-transitory computer-readable medium for wireless communication by a source base station (BS), comprising:
instructions that, when executed by at least one processor, cause the at least one processor to:
decide to handover a user equipment (UE) from the source BS to a target BS, wherein the source BS and the target BS are associated with a same radio access technology (RAT);
receive information regarding UE capability to allocate a portion of UE resources for initiating a handover procedure for the handover of the UE from the source BS to the target BS while maintaining connectivity with the source BS, wherein the information includes information regarding a UE capability to:
switch at least one transmit chain of a plurality of transmit chains, at least one receive chain of a plurality of receive chains, or a combination thereof to the target BS for initiating the handover procedure; and
maintain connectivity with the source BS using at least one remaining transmit chain of the plurality of transmit chains and at least one remaining receive chain of the plurality of receive chains; and
transmit an indication to the UE regarding the handover based on the UE capability.

* * * * *